United States Patent [19]

Hain

[11] 4,449,399
[45] May 22, 1984

[54] APPARATUS FOR DETECTING THE PASSAGE OF MULTIPLE SUPERPOSED DOCUMENTS ALONG A FEED PATH

[75] Inventor: David A. Hain, Monifieth, Scotland
[73] Assignee: NCR Corporation, Dayton, Ohio
[21] Appl. No.: 414,152
[22] Filed: Sep. 2, 1982
[30] Foreign Application Priority Data Jan. 12, 1982 [GB] United Kingdom ............... 8200793

[51] Int. Cl.³ ........................... G01B 5/06; B65H 7/12
[52] U.S. Cl. ................................... 73/159; 200/61.41;
200/330; 200/61.13; 209/603; 209/604;
271/263
[58] Field of Search ....................... 209/534, 600–604;
271/262, 263; 33/147 L; 73/159; 200/61.13,
61.41, 61.42, 330, DIG. 29; 221/21; 340/674,
675, 678

[56] References Cited

U.S. PATENT DOCUMENTS

| | | | |
|---|---|---|---|
| 2,303,681 | 12/1942 | Buccicone | 209/603 |
| 2,337,064 | 12/1943 | Peters | 209/603 |
| 3,354,273 | 11/1967 | Bleiman | 200/61.41 |
| 4,068,385 | 1/1978 | Mitzel | 209/603 X |
| 4,073,488 | 2/1978 | Uchida | 271/263 |
| 4,365,508 | 12/1982 | Loftus | 73/159 |

FOREIGN PATENT DOCUMENTS 2137269 2/1973 Fed. Rep. of Germany .
898715 6/1962 United Kingdom .

Primary Examiner—Robert B. Reeves
Assistant Examiner—Edward M. Wacyra
Attorney, Agent, or Firm—J. T. Cavender; Albert L. Sessler, Jr.

[57] ABSTRACT

A double detect device includes first and second parallel and superposed rows of steel balls retained in a block, the first row being in contact with a steel roller whose axis is parallel to the rows of balls. An actuating rod is urged resiliently against an end ball of the second row. In operation, currency notes are fed between the roller and the first row of balls. The passage of a note through the device depresses the balls of the first row thereby urging apart the balls of the second row so as to move the rod. If two superposed notes pass through the device movement of the rod is sufficient to actuate a switch. The device can distinguish between multiple notes and a single note having a localized increase in thickness, since such single note does not move the rod sufficiently to actuate the switch.

9 Claims, 8 Drawing Figures

APPARATUS FOR DETECTING THE PASSAGE OF MULTIPLE SUPERPOSED DOCUMENTS ALONG A FEED PATH

BACKGROUND OF THE INVENTION

This invention relates to an apparatus for detecting the passage of multiple superposed documents along a feed path, such an apparatus being often referred to as a double detect device.

As the automatic transporting and processing of documents such as currency notes or checks has grown in recent years, the need has increased for a simple and reliable means requiring minimal adjustment for detecting when a document, such as a currency note in an automatic cash dispensing machine or a check in a check sorting machine, has become superposed on another, since such superpositioning may produce undesirable results such as the dispensing of an excessive amount of money from an automatic cash dispensing machine.

Various double detect devices have been proposed. For example, in operation of one known double detect device currency notes are fed between a pair of gauging rollers. In the event of multiple notes (or an excess thickness note) passing between the rollers, the axis of one of the rollers is displaced by an amount such that a note rejecting means is actuated, actuation of the rejecting means causing the notes or note to be diverted into a reject hopper. This known device has the disadvantage that it does not distinguish between superposed notes and a single note having a localized increase in thickness, brought about for example by a crease or fold in the note or by the attachment thereto of extraneous matter such as adhesive tape. As a result, there is a tendency for such known device to reject an excessive number of notes, and the use of such device in an automatic cash dispensing machine would tend to increase maintenance costs, since the rejection of an excessive number of notes would decrease the period of time between successive replenishments of the machine with currency notes.

SUMMARY OF THE INVENTION

The present invention provides a double detect device which can distinguish between two or more superposed documents and a single document having a localized increase in thickness.

In accordance with one embodiment of the invention, an apparatus for detecting the passage of multiple superposed documents along a feed path comprises an elongated housing; a stop means at one end of the housing; a movable actuating member at the other end of the housing; first and second superposed rows of substantially non-compressible elements retained in said elongated housing, the elements extending between said means at one end of the housing and said movable actuating member at the other end of the housing with each row of elements being in contact with the other row and with the centers of all the elements being spaced apart along the housing; roller means having a fixed axis of rotation and positioned in contact with, and extending along the length of, said first row of elements; means for urging said actuating member into engagement with the end element at said other end of said housing whereby the end element at said one end of said housing is urged against said stop means; means for feeding documents along said feed path between said roller means and said first row of elements in a direction transverse to the axis of said roller means whereby there is brought about a movement of said actuating member away from said stop means; and means for detecting a movement of said actuating member away from said stop means in excess of a predetermined amount.

It is accordingly an object of the present invention to provide a novel and efficient double detect device.

A further object is to provide a simple and reliable double detect device which can readily distinguish between two or more superposed documents and a single document having a localized increase in thickness.

With these and other objects, which will become apparent from the following description, in view, the invention includes certain novel features of construction and combinations of parts, a plurality of forms or embodiments of which are herein described with reference to the drawings which accompany and form a part of this specification.

DETAILED DESCRIPTION

Figure 1:
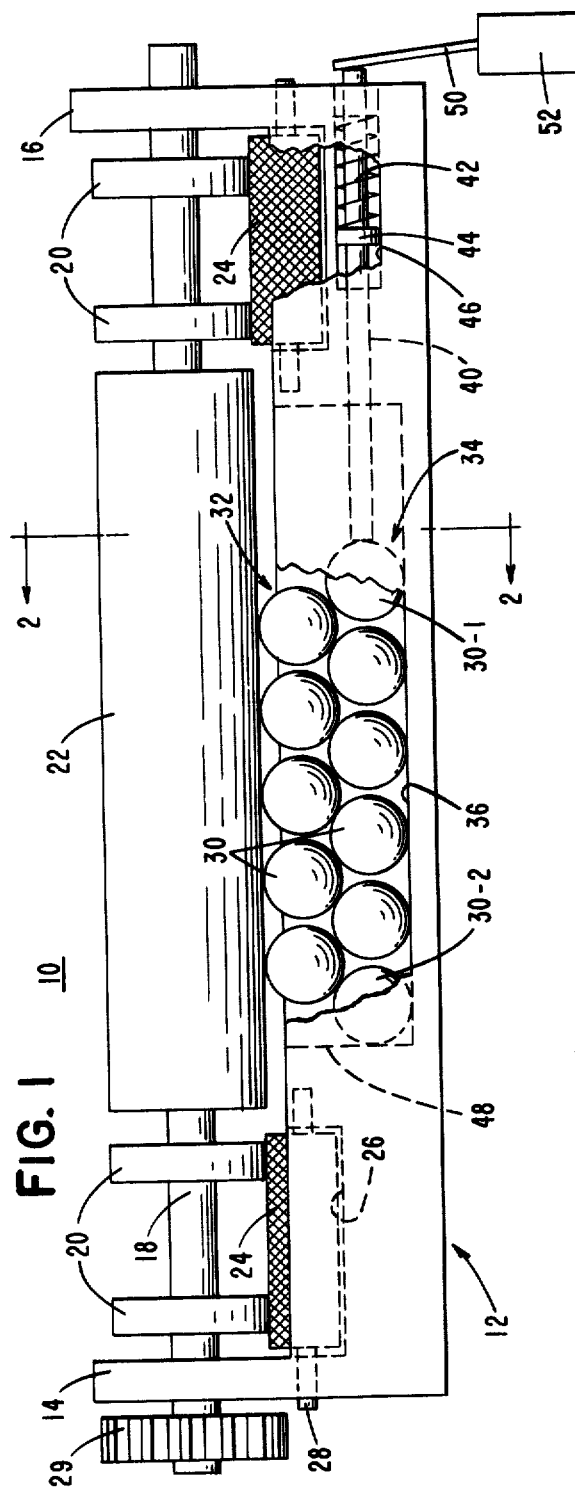
FIG. 1 is a side elevational view, shown partly broken away, of a double detect device in accordance with the invention for detecting the passage of multiple superposed currency notes along a feed path.
Figure 2:
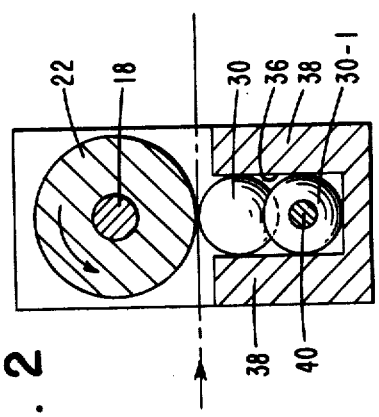
FIG. 2 is a sectional view taken along the line 2—2 of FIG. 1.

Referring to FIGS. 1 and 2, the double detect device 10 shown therein includes an elongated metal block 12 having support portions 14 and 16 respectively provided at its ends. A shaft 18 is rotatably mounted on the support portions 14 and 16, the shaft 18 having secured to it two pairs of rubber feed rolls 20 and an elongated steel roller 22. Each pair of feed rolls 20 engages with a respective knurled roller 24 which is partially accommodated in a respective recess 26 formed in the block 12 and which is mounted on a respective shaft 28 rotatably mounted in the block 12. A gear wheel 29 is mounted on a part of the shaft 18 projecting beyond the support portion 14, the gear wheel 29 being driven by drive means (not shown) so as to cause the shaft 18 to rotate continuously in operation. The rubber rolls 20 and the cooperating rollers 24 serve to feed currency notes through the device 10 in the direction indicated by the arrowed line in FIG. 2, the short edges of each note respectively passing over the rollers 24, with each short edge being gripped by one or both of the respective pair of rubber rolls 20 depending on the size of the note.

The device 10 incorporates a plurality of identical smooth steel balls 30 which are arranged in first and second parallel rows 32 and 34 disposed one above the other. The balls 30 are retained in an elongated recess 36 formed in the block 12, the recess 36 extending parallel to the axis of the steel roller 22. Each of the balls 30 is an accurate sliding fit between the side walls 38 of the recess 36. The two rows 32 and 34 are parallel to the axis of the roller 22, the balls of the row 32 being in contact with the roller 22. Each ball of the row 32 is in engagement with an adjacent pair of balls of the row 34, as shown in FIG. 1, so that the centers of the balls 30 are spaced apart along the length of the recess 36. In the embodiment described, the first row 32 comprises five balls and the second row 34 comprises six balls, although it should be appreciated that different numbers of balls could be used.

The ball 30-1 at one end of the row 34 is engaged by one end of an actuating rod 40 slidably mounted in the block 12. The rod 40 is urged resiliently against the ball 30-1 by means of a compression spring 42 one end of which engages with a collar 44 formed on the rod 40 and the other end of which abuts against an end wall (not shown) of a cavity 46 in the block 12, along which cavity the collar 44 is slidably movable. The pressure exerted by the rod 40 on the ball 30-1 causes the ball 30-2 at that end of the row 34 remote from the rod 40 to be urged against the respective end wall 48 of the recess 36, and also causes the balls of the other row 32 to be urged against the roller 22; by virtue of this arrangement there is no play in the ball assembly. As shown in FIG. 1, there is a small gap between each adjacent pair of balls in the row 32 and between each adjacent pair of balls in the row 34; this is important in ensuring that all the balls of the row 32 are in contact with the roller 22.

That end of the rod 40 which is remote from the ball 30-1 projects outside the block 12 and engages with a switch arm 50 of an electrical switch 52.

Figure 3:
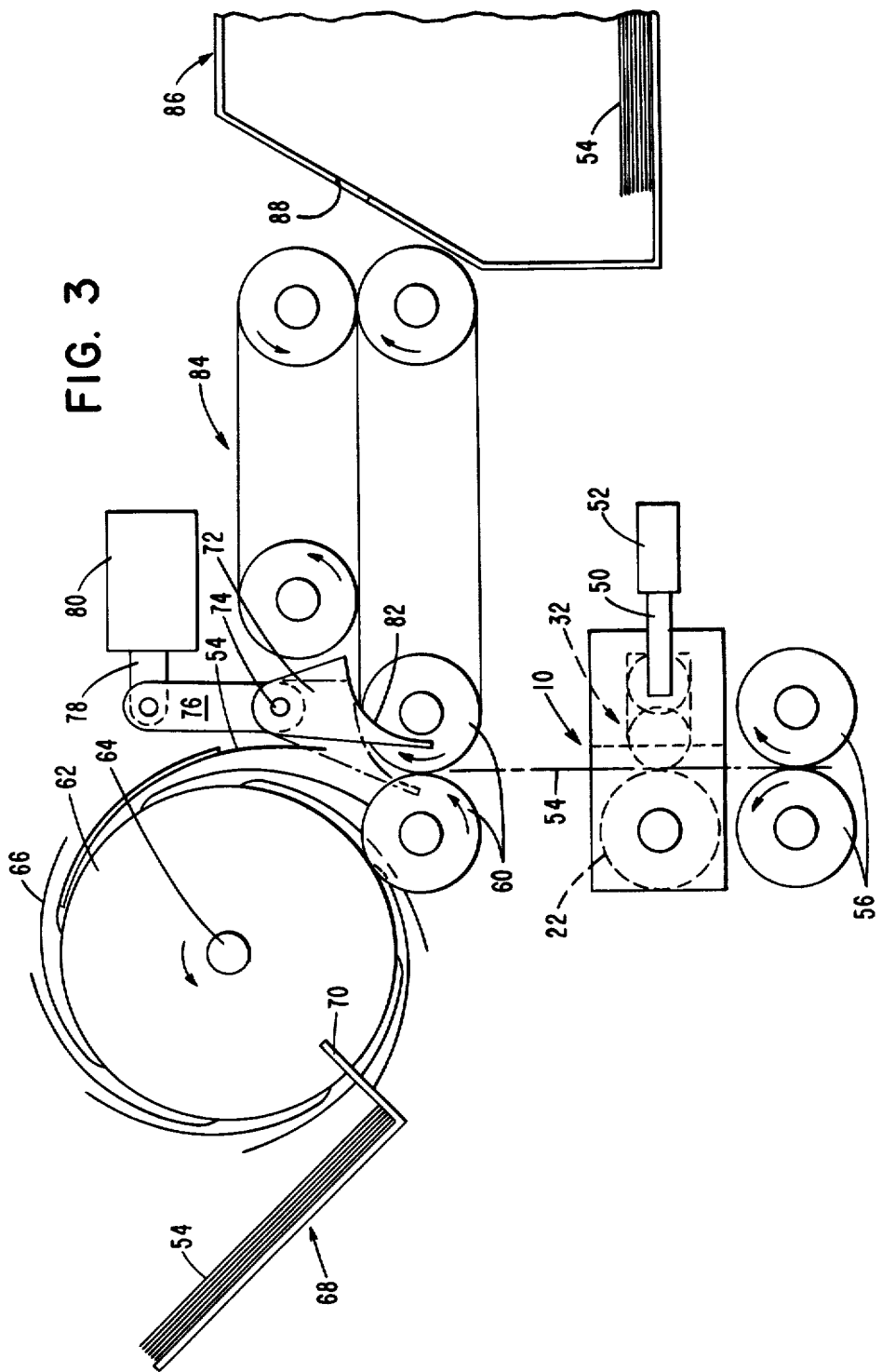
FIG. 3 is a schematic view of a currency note handling apparatus incorporating the double detect device of FIGS. 1 and 2.

Referring now briefly to FIG. 3, the double detect device 10 is included in a currency note handling apparatus which may form part of an automatic cash dispensing machine. Currency notes 54 are arranged to be fed one by one from a dispenser module (not shown) by a feed system including a pair of cooperating feed rolls 56 which rotate in the senses indicated by the arrows in FIG. 3. The rolls 56 serve to feed the notes 54 to the double detect device 10, each note being gripped between two or more of the rubber rolls 20 and the cooperating rollers 24 of the device 10 and being fed thereby between the steel roller 22 and the first row 32 of balls.

Figure 4A:
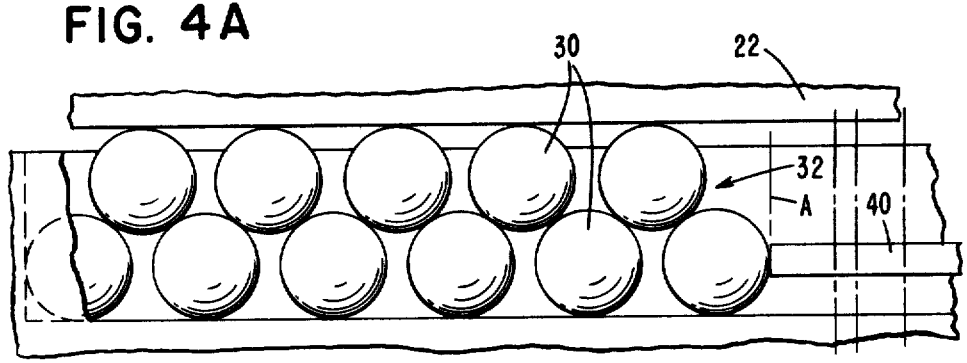
FIGS. 4A–4D are schematic views of part of the double detect device, illustrating its manner of operation.
Figure 4B:
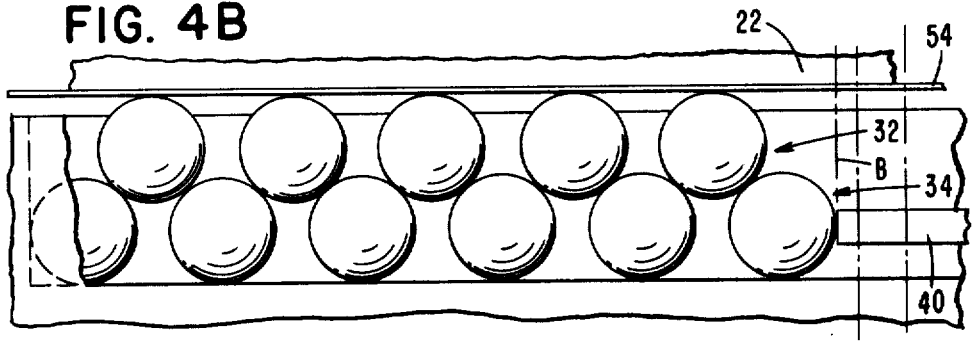
Figure 4C:
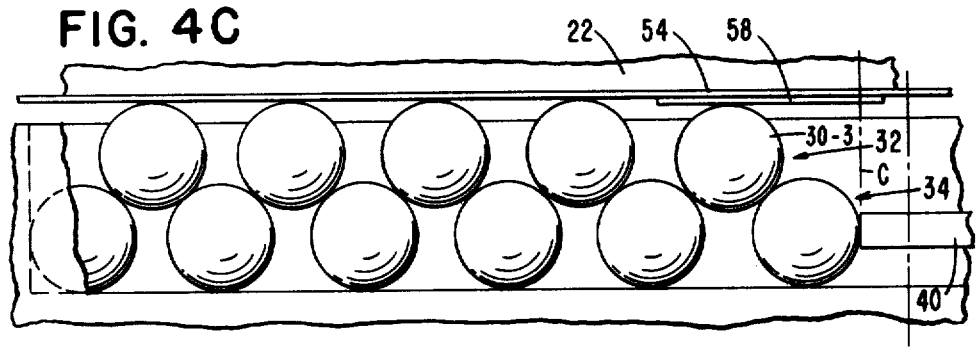

The operation of the double detect device 10 will now be described with additional reference to FIGS. 4A-4D. FIG. 4A shows the position of the balls 30 and the actuating rod 40 when no currency note is present between the roller 22 and the first row 32 of balls. When a single note 54 is present between the roller 22 and the row 32, as shown in FIG. 4B, all the balls of the first row 32 are depressed by a distance equal to the thickness of the note. Each ball so depressed urges apart the adjacent pair of balls of the second row 34, and this urging apart of the balls of the row 34 has a cumulative effect in moving the adjacent end of the actuating rod 40 from the position A shown in FIG. 4A to the position B shown in FIG. 4B. If a currency note passing through the device 10 has a localized increase in thickness due, for example, to a crease or fold or to the attachment to it of a foreign body 58 such as a piece of adhesive tape, as shown in FIG. 4C, then where the increase in thickness occurs the adjacent ball 30-3 of the row 32 is depressed by an additional amount equal to this increase in thickness. This additional depression urges apart the adjacent pair of balls of the second row 34 by an additional amount and thereby causes the adjacent end of the rod 40 to be moved from position B to the position C shown in FIG. 4C. However, it will be appreciated that only one pair of balls of the second row 34 are urged apart by this additional amount and so the distance the rod 40 moves when moving from position B to position C is relatively small compared to the distance it moves when moving from position A to position B.

Figure 4D:
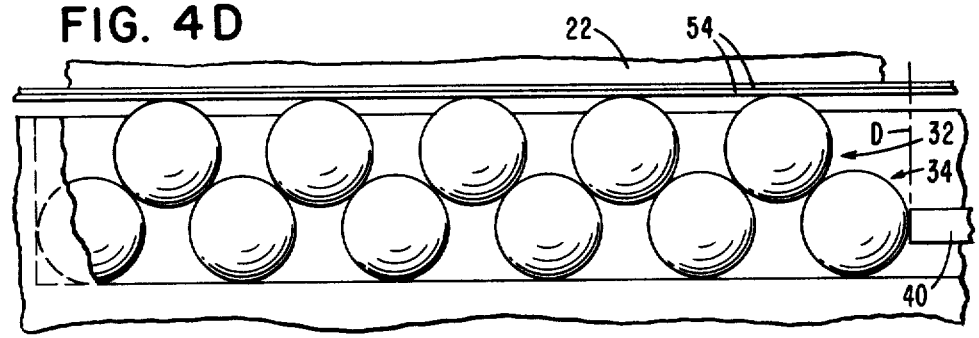

If two superposed notes 54 pass between the roller 22 and the row 32 as shown in FIG. 4D, then all the balls of the row 32 are depressed by a distance equal to the combined thickness of the superposed notes, and each depressed ball brings about an urging apart of the adjacent pair of balls of the row 34 by an increased distance compared with the distance this pair were urged apart for the situation shown in FIG. 4B. Again, the urging part of all the adjacent pairs of balls of the row 34 has a cumulative effect in moving the adjacent end of the rod 40 from the position C to the position D shown in FIG. 4D. The switch 52 is so arranged that it is operated when the rod 40 is moved in excess of a predetermined amount, the predetermined amount corresponding to a position of the relevant end of the rod intermediate the position C shown in FIG. 4C and the position D shown in FIG. 4D. It will be appreciated therefore that only the presence of at least two superposed notes 54 (or a note of excess thickness equivalent to the combined thickness of at least two superposed notes) between the roller 22 and the row 32 of balls will bring about operation of the switch 52, the occurrence of a localized increase in thickness of a single note being ineffective to bring about operation of the switch 52.

Referring again to FIG. 3, after passing through the double detect apparatus 10 each currency note 54 is gripped by a further pair of feed rolls 60 and, assuming that the switch 52 is not operated, the note is fed to a stacking device which may take the form of a plurality of stacker wheels 62 mounted on, and spaced apart along, a drive shaft 64 which is arranged to be driven in operation in synchronism with the gear wheel 29 of the double detect device 10 in the sense indicated by the arrow in FIG. 3. The stacker wheels 62 are each provided with a plurality of arcuate fingers 66. Corresponding pairs of adjacent fingers 66 of the stacker wheels 62 are arranged to receive between them a currency note 54 fed from the feed rolls 60 and to transport it to a note receptacle 68 where the notes are formed into a bundle for subsequent transport by means not shown to a note delivery station of the cash dispensing machine. The receptacle 68 includes a comb-like support portion 70, each stacker wheel 62 being arranged to pass between adjacent teeth of the comb-like portion 70.

Associated with the pair of feed rolls 60 is a gate means comprising a plurality of pivotable guide members 72 mounted on a shaft 74. One end of an arm 76 is secured to the shaft 74, the other end of the arm 76 being pivotally coupled to an armature 78 associated with a solenoid 80. The solenoid 80 is arranged to be energized in response to operation of the switch 52. The arrangement is such that with the solenoid 80 in a non-energized condition the guide members 72 are in the position shown in solid outline in FIG. 3, out of the feed path of the currency notes 54. Upon the switch 52 being operated in response to the passage through the double detect device 10 of multiple superposed notes, the solenoid 80 is energized so as to retract the armature 78 and thereby bring about pivotal movement of the guide members 72 via the arm 76 and the shaft 74. This pivotal movement brings the guide members 72 into the position shown in dotted outline in FIG. 3 in which they are positioned in the feed path of the multiple notes detected by the double detect device 10. Curved guide surfaces 82 of the guide members 72 serve to guide the multiple notes to a belt transport device 84 which feeds the notes to a reject bin 86, the notes being deposited into the bin 86 through a slot 88.

Figure 5:
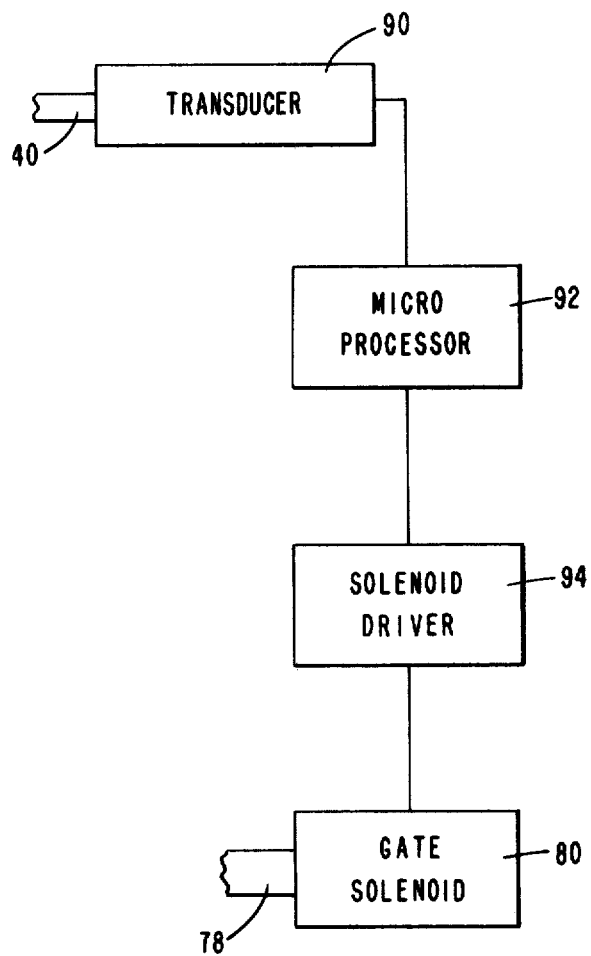
FIG. 5 is a block diagram of an electrical circuit utilized with a modified version of the double detect device.

Referring to FIG. 5, in a modification of the double detect device described above the switch 52 is replaced by a displacement transducer 90 arranged to produce an analog output signal which is dependent upon the amount of movement of the actuating rod 40 brought about by the passage of a single note or multiple notes through the double detect device 10. The output of the transducer 90 is connected to the solenoid 80 via a microprocessor 92 and a solenoid driver 94. The microprocessor 92 has stored in it information relating to the signal produced by the transducer 90 in response to a note of known standard thickness passing through the double detect device 10, and the microprocessor 92 can thereby determine what output signal from the transducer is representative of the passage of multiple superposed notes through the double detect device 10 (corresponding to movement of the actuating rod 40 away from the end wall 48 in excess of a predetermined amount). When the microprocessor 92 detect the presence of multiple notes (or an excess thickness note of equivalent thickness) between the roller 22 and the row of balls 32, it causes the driver 94 to energize the solenoid 80. The use of a transducer has the advantage that it provides a particularly reliable means of sensing the passage of multiple superposed notes through the double detect device.

It will be appreciated that the double detect device described above is a mechanism of simple construction which can readily distinguish between two or more superposed notes and a single note having only a localized increase in thickness, by virtue of the fact that it senses the thickness of a plurality of locations spaced apart across the note. Also, the double detect device has the additional advantage that it provides a convenient means of magnifying the difference in thickness between a single note and multiple superposed notes passing through the device.

While the forms of the invention shown and described herein are admirably adapted to fulfill the objects primarily stated, it is to be understood that it is not intended to confine the invention to the forms or embodiments disclosed herein, for it is susceptible of embodiment in various other forms within the scope of the appended claims.

I claim:

1. An apparatus for detecting the passage of multiple superposed documents along a feed path, comprising:
   an elongated housing;
   a stop means at one end of the housing;
   a movable actuating member at the other end of the housing;
   first and seond superposed rows of substantially noncompressible elements retained in said elongated housing, the elements extending between said stop means at one end of the housing and said movable actuating member at the other end of the housing with each row of elements being in contact with the other row and with the centers of all the elements being spaced apart along the housing;
   roller means having a fixed axis of rotation and positioned in contact with, and extending along the length of, said first row of elements;
   means for urging said actuating member into engagement with the end element at said other end of said housing whereby the end element at said one end of said housing is urged against said stop means;
   means for feeding documents along said feed path between said roller means and said first row of elements in a direction transverse to the axis of said roller means whereby there is brought about a movement of said actuating member away from said stop means; and
   means for detecting a movement of said actuating member away from said stop means in excess of a predetermined amount.

2. The apparatus of claim 1 in which the elements are balls.

3. An apparatus according to claim 2, wherein said actuating member is urged against the ball at one end of said second row, the ball at the other end of said second row being urged against said stop means.

4. An apparatus according to claim 3, wherein each ball of said first row is in contact with two adjacent balls of said second row, the number of balls in said second row being one greater than the number of balls in said first row.

5. An apparatus according to claim 2, wherein there is a gap between each adjacent pair of balls in each row.

6. An apparatus according to claim 2, wherein all the balls are of substantially the same size.

7. An apparatus according to claim 6, wherein each of the balls is a sliding fit between opposite walls of said housing.

8. An apparatus according to claim 1, wherein said means for detecting is an electrical switch.

9. An apparatus according to claim 1, wherein said means for detecting includes a transducer arranged to produce an analog output signal dependent on the extent of movement of said actuating means away from said stop means.

* * * * *